Dec. 13, 1949  J. H. MARCUM  2,491,385
AIR LINE GAUGE
Filed Feb. 6, 1948  2 Sheets-Sheet 1
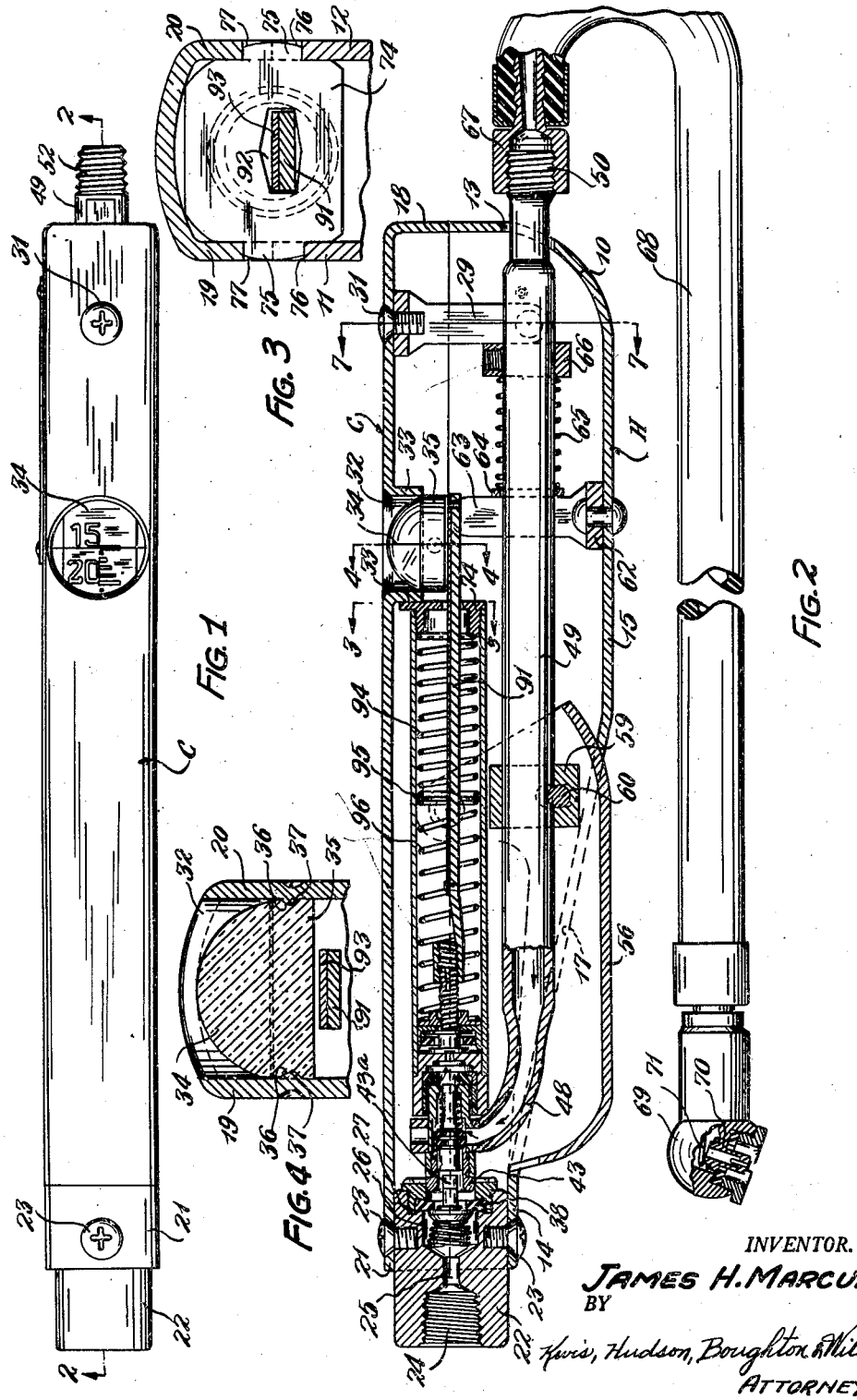
INVENTOR.
JAMES H. MARCUM
BY
Kwis, Hudson, Boughton & Williams
ATTORNEYS Dec. 13, 1949  J. H. MARCUM  2,491,385
AIR LINE GAUGE
Filed Feb. 6, 1948  2 Sheets-Sheet 2
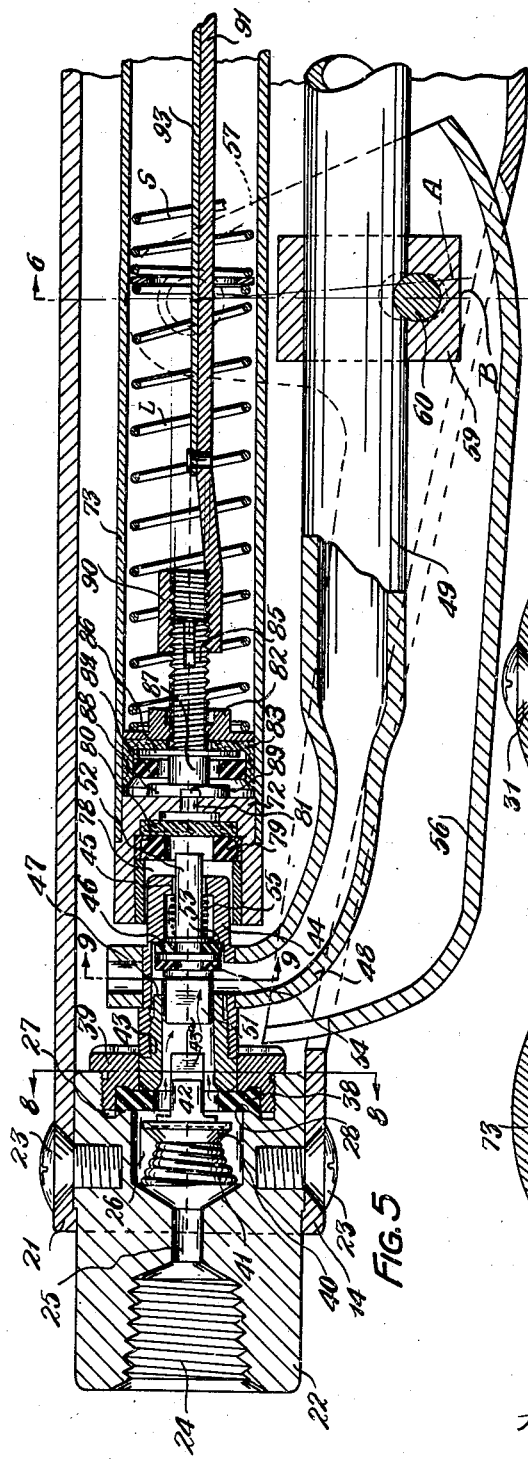
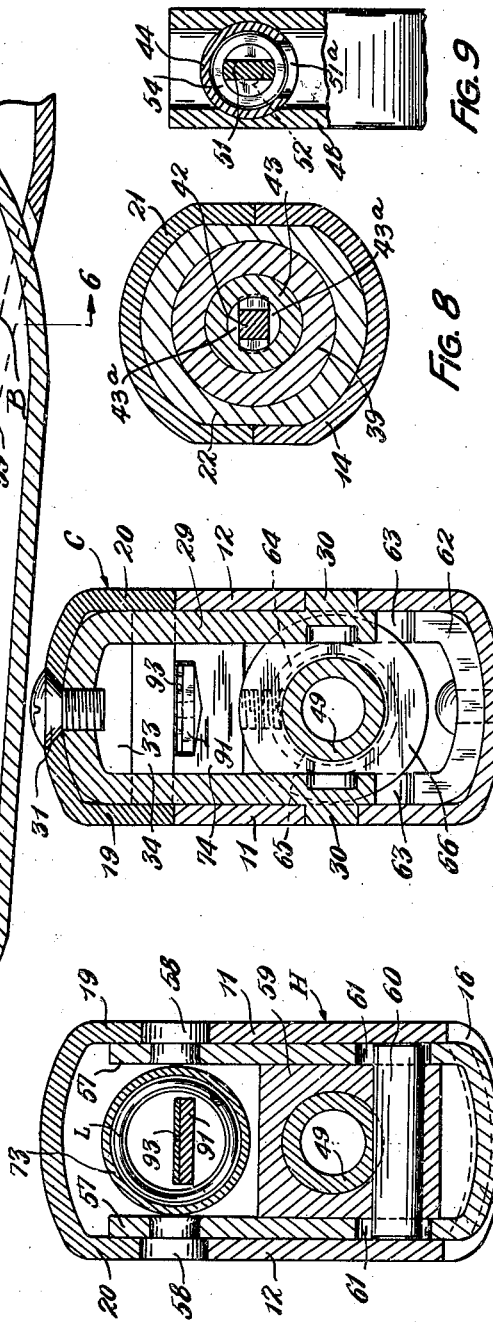
INVENTOR.
JAMES H. MARCUM
BY
Kwis, Hudson, Boughton & Williams
ATTORNEYS Patented Dec. 13, 1949

2,491,385

UNITED STATES PATENT OFFICE 2,491,385

AIR-LINE GAUGE

James H. Marcum, Cleveland Heights, Ohio, assignor to The Dill Manufacturing Company, Cleveland, Ohio, a corporation of Ohio Application February 6, 1948, Serial No. 6,727

11 Claims. (Cl. 137—69.5)

This invention relates to a combined tire inflating device and pressure gauge generally known as an air line gauge.

This invention is an improvement on the devices disclosed in Moody Patents Nos. 1,879,404, September 27, 1932, and 2,040,868, May 19, 1936, and Crowley Patent No. 2,285,569, June 9, 1942.

An object of the invention is to provide an airline gauge which combines a tire inflating device and pressure gauge and which is so constructed and shaped that it can be handled and manipulated with great facility and the operator by a simple squeezing action of one hand can change the gauging function of the device to an inflating function or vice versa.

Another object is to provide an airline gauge of the type specified which is manipulated by means of a handle portion of such size and shape as to be readily grasped by one hand of the operator and wherein the movable actuating element for changing the function of the device from a gauging function to an inflating function or vice versa is located on the underside of the handle portion and movement is imparted thereto by the operator merely squeezing the handle portion.

Another object of the invention is to provide a combined tire inflating device and pressure gauge wherein a main valve controls the pressure fluid flow to the device from a supply source, a manually actuated means mechanically controls the opening of said main valve, and shiftable selector valve means responsive when the main valve is open to the fluid pressure in the device for movement to interrupt the flow of pressure fluid to the pressure gauge.

Another object is to provide an air line gauge of the type referred to and which is of simple construction, is formed of relatively few parts, is easily assembled and disassembled, utilizes in its organization readily made or conventional elements or parts and provides for the ready disassembly and replacement of the various parts or elements.

Further and additional objects and advantages not hereinbefore specified will become apparent during the detailed description of an embodiment of the invention which is to follow and which embodiment is illustrated in the accompanying drawing, wherein Fig. 1 is a top plan view of the air line gauge and inflating device embodying the invention with the chuck hose omitted.

Fig. 2 is a longitudinal sectional view taken substantially on line 2—2 of Fig. 1, looking in the direction of the arrows, with the chuck hose and air chuck attached to the device and shown partly in section and partly in elevation, the parts being shown in their normal relationship wherein the pressure gauge is in communication with the chuck hose.

Fig. 3 is a fragmentary transverse vertical sectional view taken substantially on line 3—3 of Fig. 2 looking in the direction of the arrows.

Fig. 4 is a fragmentary transverse vertical sectional view taken substantially on line 4—4 of Fig. 2 looking in the direction of the arrows.

Fig. 5 is a fragmentary view similar to Fig. 2 but on a larger scale and showing the operative parts of the air line gauge in different relationship than that of Fig. 2, and wherein the chuck hose is in communication with the air line and is out of communication with the pressure gauge.

Fig. 6 is a transverse vertical sectional view taken substantially on line 6—6 of Fig. 5 looking in the direction of the arrows.

Fig. 7 is a transverse vertical sectional view taken substantially on line 7—7 of Fig. 2 looking in the direction of the arrows.

Fig. 8 is a transverse vertical sectional view taken substantially on line 8—8 of Fig. 5 looking in the direction of the arrows, and Fig. 9 is a fragmentary transverse vertical sectional view taken substantially on line 9—9 of Fig. 5 looking in the direction of the arrows.

The air line gauge and inflating device embodying the present invention comprises a housing H and a detachable cover C adapted to be secured in position on the housing. The housing H is substantially U-shaped in cross section while the cover C is of inverted U-shape in cross section when assembled on the housing, the depending legs of the cover being substantially shorter than the upstanding legs of the housing. When the cover and housing are secured together they form an elongated relatively narrow casing which can be conveniently grasped by the one hand of an operator. In use the device is held by the operator so that the cover C is uppermost to facilitate the reading of the pressure gauge and the operation of the device.

The right hand end of the housing H, as viewed in Fig. 2, is provided with an upwardly curved wall portion 10 uniting the legs 11 and 12 of the housing. This upwardly curved wall portion 10 of the housing is provided with an opening 13 for a purpose later to be explained. The left hand end of the housing H, as viewed in Fig. 2, is provided with a reduced arcuate extension portion 14, see Figs. 2, 5 and 8. The bottom 15 of the housing H is cut away to provide an opening, as indicated at 16 in Fig. 6, and the lower edges of the walls 11 and 12 of the housing H at this location are upwardly inclined, as indicated at 17 in Fig. 2, from the bottom wall 15 to the arcuate extension portion 14.

The cover C at its right hand end as viewed in Fig. 2 is provided with a downwardly extending wall 18 interconnecting the legs 19 and 20 of the cover and aligning with the upper end of the upwardly curved portion 10 of the housing when the cover is secured in position on the housing. The left hand end of the cover as viewed in Fig. 2 is provided with an arcuate extension portion 21 which when the cover and housing are secured together forms a cylindrical neck on the device. This cylindrical neck has secured therein a cylindrical fitting head 22 which extends inwardly of the cylindrical neck and is secured in position by screws or other suitable means 23 carried by the portions 14 and 21 forming the cylindrical neck. If desired the head 22 may be formed of two interconnected parts in place of the single integral head shown in the drawings. The outer end of the fitting head 22 is provided with a tapered threaded counterbore 24 for the purpose of enabling an air line to be attached to the device by means of a suitable threaded coupling, it being understood that such air line extends from a source of supply of compressed air. The counterbore 24 communicates with a bore 25 which communicates with a counterbore 26 formed in the fitting head 22 and which communicates, in turn, with a threaded counterbore 27 formed in the inner end of the fitting head 22. The counterbore 27 is provided in its bottom with an annular shoulder 28 for a purpose later to be explained.

Referring to Fig. 7, it will be seen that an inverted U-shaped strap 29 has its legs extending into the housing H and closely fitting the inner sides of the upstanding legs 11 and 12 of the housing. The legs of the inverted U-shaped strap 29 are provided with outwardly extending bosses 30 which project into openings formed in the legs 11 and 12 of the housing, it being understood that in assembling the strap 29 to the housing the legs 11 and 12 of the latter are spread apart until the bosses 30 snap into the openings referred to. The inverted U-shaped strap 29 extends above the open upper side of the housing H and interfits the interior of the cover C wherefore a securing screw 31 carried by the cover can be screwed into the bottom or base of the inverted U-shaped strap 29 to clamp the cover in position on the housing.

It will be noted that the cover is held in position on the housing by the screws 23 and 31 and may be readily removed from the housing by simply removing said screws and, hence, access is readily obtained to the parts within the housing. The cover C is provided with an opening 32 and interiorly of said opening has a cylindrical inwardly extending flange constituted of the arcuate inturned flanges 33 formed from the material severed from the cover to produce the opening. The opening receives within the cylindrical flange 33 the convex dome-shaped portion 34 of a magnifying button which also is provided on its inner end with a cylindrical portion 35, tangentially contacting the legs 19 and 20 of the cover and provided at the points of tangency with V-shaped recesses 36. The recesses 36 are adapted to receive complementally shaped knobs 37 formed on the inner sides of the legs 19 and 20. It will be understood that the magnifying button 34 may be inserted into the opening 32 and held in position therein by the snap action of the knobs 37 engaging in the recesses 36. This provides a ready means of assembling the magnifying button in the device while insuring that it will be held in properly assembled position. The magnifying button overlies the scale bar later to be referred to of a suitable pressure gauge and may be formed of glass, plastic or other suitable material capable of magnifying the graduations and numerals appearing on the adjacent side of the scale bar.

A washer or packing 38 is clamped in the counterbore 27 of the head 22 and against the shoulder 28 at the bottom of said counterbore by means of a nut 39 screwed into the counterbore 27. The washer 38 is provided with a central opening communicating with the counterbore 26 in the head 22 and with a central bore in the nut 39 and said opening in the washer 38 is normally closed by means of a main valve 40 located in the counterbore 26 of the head 22 and held seated against the washer by a valve spring 41.

The main valve 40 is provided with a valve pin 42 extending through the opening in the washer 38 into the central opening in the nut 39. The opening in the nut 39 slidably receives a tubular valve actuating head 43 which normally is in the position shown in Fig. 2 and at such time it is out of contact with the gasket 38. As will later be explained the valve actuating head 43 can be moved toward the gasket 38 to engage the same as indicated in Fig. 5 and when so moved the valve pin 42 will be engaged by suitably shaped diametrically disposed flats 43a located interiorly of the actuating head 43 and effect mechanically an unseating of the valve 40 against the action of the spring 41. The valve actuating head 43 is externally threaded and has a screwed connection to the open end of an elongated cup-shaped member 44 that is provided in its closed end with a central opening 45 for a purpose later to be explained. The actuating head 43 and the cup-shaped member 44 may be termed jointly as an endwise shiftable tubular member. The cup-shaped member 44 is provided with an internal shoulder 46 constituting a valve seat while the inner end of the valve actuating head 43 is indicated at 47 and also constitutes a valve seat. The cup-shaped member 44 has a pressed fit in diametrally aligned openings formed in the upstanding reduced end portion 48 of an air tube, said portion 48 of the tube merging with a portion 49 thereof of larger diameter and extending longitudinally of the housing H and projecting outwardly of the opening 13 in the end of the housing and provided with a tapered threaded end 50 located outwardly of the housing for a purpose later to be explained.

The manner in which the cup-shaped member 44 has a pressed fit in the portion 48 of the air tube is clearly shown in Fig. 9 and it will be noted that said cup-shaped member 44 is provided with an opening 51a communicating with the air tube while the cup-shaped member 44 seals the inner open end of said tube. An endwise movable valve pin is mounted in the actuating head 43 and in the cup-shaped member 44 and comprises a flat portion 51 which has a guiding sliding fit in the actuating head 43, a rounded pin portion 52 which extends through the opening 45 in the closed end of the cup-shaped member 44 and an intermediate portion which mounts valve gaskets 53 and 54 adapted to seat, respectively, on the internal shoulder 46 of the cup-shaped member and on the end 47 of the valve actuating head. A coil spring 55 surrounding the pin portion 52 tends to normally urge the valves toward the left as viewed in the drawings to seat the valve gasket 54 on the end 47 of the actuating head 43. This is the condition that obtains when the parts are in the position shown in Fig. 2 and at such time the interior of the air tube is in communication with the opening 45 in the bottom of the cup-shaped member 44. When the actuating head 43 and cup-shaped member 44 are moved to the position shown in Fig. 5, at which time the actuating head has seated on the gasket 38, then the main valve 40 is unseated and air from the air line enters the head 43 and moves the valve gaskets 54 and 53 toward the right against the action of the coil spring 55 until the valve gasket 53 is seated on the shoulder 46. At this time the air tube is in communication with the counterbore 26 in the fitting head 22 and with the air line extending from the source of compressed air. The valve pin and valve gaskets 53 and 54 may be termed as shiftable selector valve means. In order that the operator may conveniently move the air tube, the cup-shaped member 44 and the valve actuating head 43 from the normal position shown in Fig. 2 to the position shown in Fig. 5 the following arrangement is employed.

An actuating trigger 56 substantially U-shaped in cross-section is mounted in the opening 16 and has upwardly extending leg portions 57 located within the side walls or legs 11 and 12 of the housing H and the side walls or legs 19 and 20 of the cover C. The leg portions 57 of the actuating trigger carry laterally projecting headed rivet-like trunnions 58, the heads of which are rockably mounted in cooperating semi-circular recesses formed in the upper edge of the legs of the housing and in the lower edge of the legs of the cover, wherefore the trigger 56 can be rocked about the axis of said trunnions inwardly and outwardly of the housing. A block 59 is located intermediate the legs of the trigger 56 and is provided with an opening through which extends the portion 49 of the air tube. The block 59 mounts a pin 60 which has its opposite ends projecting into vertically elongated openings 61 formed in the legs of the trigger 56. The pin 60 extends into a chordal-like recess or cut out portion of the air tube and functions to key the portion 49 of the air tube in the block 59, wherefore when the trigger is moved about its pivotal axis 58 the air tube has imparted to it limited endwise movement, the amplitude of which is indicated by the dash lines A and B in Fig. 5. The normal position of the air tube and the trigger is indicated in Fig. 2 and at this time the valve actuating head 43 is out of contact with the gasket 38 and the main valve 40 is seated. The axial center of the pin 60 at this time is located in the plane of line A. When the trigger 56 is pressed inwardly of the housing the axial center of the pin 60 shifts from the plane of line A to the plane of line B and the valve actuating head 43 is moved by the endwise movement of the air tube from the position shown in Fig. 2 into the position shown in Fig. 5, at which time the main valve 40 is unseated and the head 43 is engaging the gasket 38. The air tube and the trigger 56 and their associated parts are held in the normal position shown in Fig. 2 by spring means now to be explained.

Referring to Figs. 2 and 7, it will be seen that a U-shaped bracket has its base 62 secured by suitable means such as a rivet to the bottom or base of the housing H while the legs 63 of the bracket extend upwardly within the housing adjacent the inner sides of the walls 11 and 12 of the housing. The portion 49 of the air tube passes between the legs 63 and a washer 64 mounted on the portion 49 of the air tube is held in abutting engagement with the legs 63 by means of a coil spring 65 mounted on the tube portion 49 and abutting a collar 66 fixed to said tube portion. It will be observed that the spring 65 tends at all times to urge the air tube endwise toward the right as viewed in Fig. 2 and when the operator squeezes the trigger 56 to move the air tube endwise from the position shown in Fig. 2 to the position shown in Fig. 5 he must exert sufficient pressure on the trigger to overcome the action of the spring 65. Of course as soon as the operator releases the pressure on the trigger 56 the spring 65 functions to move the parts into the normal position shown in Fig. 2.

The threaded tapered end 50 of the air tube has screwed to it a fitting 67 which is connected to a flexible chuck hose 68 mounting at its end an air chuck 69 of well known construction. The air chuck 69 enables the device to be connected to the valve stem of an inflatable container such as a pneumatic tire and when the chuck is applied to the valve stem the chuck valve 70 will be unseated against the action of the chuck valve spring 71 while the valve core in the valve stem will be unseated to place the chuck hose in communication with the inflatable article all as well understood in the art.

The device also includes a pressure gauge which comprises a gauge head 72, a gauge cylinder or casing 73 attached to the head 72 at one end and having threadedly attached thereto adjacent its other end a closure and supporting member or nut 74.

Referring to Figs. 2 and 3, it will be seen that the closure member 74 is provided on its side edges with laterally projecting ears 75 which when the device is assembled extend into notches 76 formed in the upper edges of the legs 11 and 12 of the housing and notches 77 formed in the lower edges of the downwardly extending legs 19 and 20 of the cover. In this way the right hand end of the gauge is supported in the device and is held against endwise movement. The left hand end of the gauge is supported by having the cup-shaped member 44 telescope within the counterbore 78 of the gauge head 72. The pressure gauge may be readily removed from or placed in the device when the cover C is removed from the housing. Mounted in the bottom of the counterbore 78 is a gasket 79, while a felt or other filter member 80 is mounted in the gauge head 72 in a counterbore adjoining the gasket 79. This latter counterbore communicates with a third counterbore which in turn communicates with a bore 81 that extends to and is in communication with the interior of the gauge. The gauge further comprises a piston 82 which mounts a cup-shaped piston packing 83 that is held expanded by a gasket 84 against the cylinder wall. The piston 82 is threadedly connected to a piston rod 85 that carries a head 86 clamping the cup-shaped packing to the piston while beyond the head 86 the rod 85 is provided with a smooth portion 87 having free clearance in the central opening of the gasket 84 and mounting at its end a head 88 that is provided with a diametrally extending groove 89 registering with the bore 81 in the gauge head 72. The piston rod 85 is adjustably and threadedly connected to a sleeve 90 formed integral with one end of a bar 91 which projects through an opening 92 in the supporting and closing member 74 at the right hand end of the gauge as viewed in the drawings. This opening 92 is of such size and shape that it guides the endwise movements of the bar therethrough. The bar 91 has secured to it on its upper side, as viewed in the drawings, a scale plate 93 bearing suitable graduations or scale marks and indicia representing fluid pressure in pounds, as clearly indicated in Fig. 1. The scale plate 93 underlies the magnifying button 34 so that the graduations and indicia are magnified and easily read. A coil spring 94 surrounds the bar 91 and abuts at one end the closure and supporting member 74 and at its other end a washer 95 loosely mounted in the gauge and engaging one end of a second and weaker coil spring 96 that surrounds the bar 91 and abuts at its opposite end the piston 82. It will be seen that when the piston is moved under air pressure the weaker or lighter spring 96 is first compressed before any compressive action is exerted on the stronger spring 94. The movement of the piston under the action of the air pressure continuing after the light spring 96 has been compressed a predetermined amount then effects compression of the stronger spring 94.

The details of the construction having been described the operation of the device will now be set forth to fully bring out the utility thereof and the advantages inherent therein. It will be assumed that the head 22 is connected to an air line extending from a source of compressed air and that the trigger 56 and air tube 48, 49 are in their normal position due to the action of the spring 65. At this time the valve actuating head 43 is out of contact with the gasket 38 and is in the position shown in Fig. 2, wherefore the main valve 40 is seated and hence no air is flowing through the opening in the gasket 38. At this time the spring 55 in the cup-shaped member 44 moves the valve pin 52 of the shiftable selector valve means toward the left as viewed in the drawings until the valve gasket 54 is contacting the right hand end 47 of the valve actuating head 43 while the valve gasket 53 is out of contact with the shoulder 46 and is so positioned that the air tube 48, 49 is in communication with the pressure gauge. The air line gauge or device at this time is ready for use and it will be assumed that the operator grasps the device with one hand so as to have his fingers engaging the trigger 56 while with the other hand he applies the air chuck 69 to the valve stem of the tire or container that is to have its pressure read and inflated if necessary. The application of the chuck 69 to the valve stem unseats the chuck valve 70 and the valve of the valve core in the valve stem and places the chuck hose 68 in communication with the interior of the tire or the container. Consequently the air pressure in the tire or container flows as indicated by the arrows in Fig. 2 through the air tube 48, 49, past the valve gasket 53 and into the interior of the cup-shaped member 44 from whence it flows around the pin 52 and through the opening 45 of the cup-shaped member and into the counterbore 78 of the gauge head 72. From the counterbore 78 the air pressure flows through the filter 80 into the bore 81 and into the diametral groove 89 of the head 88. The air pressure from this diametral groove 89 flows around the head 88 through the opening in the gasket 84 and acts against the head 86 as well as against the gasket 84 to move the gauge piston toward the right and against the action of the springs 94, 96, thus correspondingly shifting the bar 91 and gauge plate 93 so that the operator by observing the magnifying button 34 can read the air pressure in the tire.

Assuming this reading shows the tire or inflatable container should be inflated to a greater pressure the operator moves the trigger 56 inwardly of the housing by squeezing or gripping the device tightly with his hand and such movement of the trigger from the position shown in Fig. 2 to the position shown in Fig. 5 moves the air tube 48, 49 endwise a distance equal to the distance between the lines A and B of Fig. 5, thus shifting the valve actuating head 43 a corresponding distance and from the position of Fig. 2 to the position of Fig. 5, at which time it is engaging the gasket 38 and through its contact with the valve pin 42 has unseated the main valve 40 against the action of the spring 41. Therefore the compressed air from the source of supply now flows through the opening in the gasket 38 and into the head 43 as indicated by the arrows in Fig. 5. This air pressure acting on the valve gasket 54 of the shiftable selector valve means overcomes the action of the spring 55 and shifts the valve gaskets 54 and 53 and the valve pin 52 from the position shown in Fig. 2 into the position shown in Fig. 5, at which time the valve gasket 53 is seated against the shoulder 46 to interrupt air flow to the pressure gauge while the air tube 48, 49 is in communication with the interior of the head 43 and hence the compressed air can flow from said head into said air tube as indicated by the arrows in Fig. 5. This compressed air flowing through the air tube passes into the chuck hose 68 and through the chuck into the valve stem and the tire or container being inflated. When the operator decides that the tire or container has been inflated to the proper pressure he releases the squeezing or gripping action of his hand on the trigger 56, whereupon the spring 65 moves the trigger and the air tube 48, 49 from the position shown in Fig. 5 to the position shown in Fig. 2. This results in the valve actuating head 43 moving out of contact with the gasket 38 and allowing the main valve 40 to be seated against said gasket under the action of the spring 41, thus interrupting the flow of compressed air from the source of supply. When this condition obtains the spring 55 moves the valve gaskets 53, 54 of the shiftable selector valve means from the position shown in Fig. 5 to the position shown in Fig. 2, whereupon the pressure gauge is in communication with the air tube 48, 49 as indicated by the arrows in Fig. 2. Therefore the air pressure in the inflated tire now acts on the gauge piston to move the piston toward the right against the action of the springs 94, 96 to indicate the pressure to which the tire has been inflated. If the pressure indicated is the correct pressure the operator now removes the chuck 69 from the valve stem and places the air line gauge or device down in a suitable place awaiting its next use, whereupon the springs of the air gauge move the gauge piston back to its most left hand position. However, it will be assumed that the indicated pressure is not up to the desired pressure, whereupon the operator again squeezes the trigger 56 inwardly to effect opening of the main valve 40 to place the tire in communication with the compressed air source of supply, all as has been previously described, until he estimates that the desired pressure has been built up in the tire, whereupon he releases his grip on the trigger 56 and again takes a pressure reading.

From the foregoing detailed description of the construction and the explanation of its mode of operation it will be seen that the air line gauge embodying the present invention facilitates effectively and efficiently the inflation of a tire or inflatable container and the reading of the inflated pressure thereof. It will also have been noted that the device is so constructed that it may be readily and conveniently used by the operator. In addition, it will be seen that the removable cover C enables the parts to be readily and quickly assembled and especially will it be noted that the air gauge can be readily removed from the device for purposes of adjustment, repair or replacement, this being accomplished after the cover C has been removed by merely lifting the right hand end of the gauge out of the notches 76 and then moving the gauge toward the right until the head 72 is free of the cup-shaped member 44.

It will also have been noted that the device is formed of sturdy parts of simple construction and which parts will not readily get out of order or wear rapidly during use. The air line gauge embodying the present invention adequately and completely accomplishes each and every one of the objects hereinbefore specified.

Although a preferred embodiment of the invention has been illustrated and described herein it will be understood that the invention is susceptible of various modifications and adaptations within the scope of the appended claims.

Having thus described my invention I claim:

1. An air line gauge and inflating device comprising a housing having means for connecting an air line thereto, an endwise shiftable tubular member in said housing in communication with said means, a main valve carried by said means and when closed interrupting said communication but adapted to be opened by said member when the latter is shifted in one direction, means urging said valve toward closed position, a pressure gauge in said housing operatively associated and in communication with said member, an air tube operatively associated and in communication with said member and extending outwardly of said housing and adapted to be connected to an air chuck hose, shiftable selector valve means in said member normally maintained by biasing means in a position wherein said air tube is in communication with said pressure gauge through said member but shiftable by air pressure in said member when said main valve is opened to a position wherein communication between said tube and pressure gauge is interrupted but said tube remains in communication with said member and said first means, and manually actuated means operatively associated with said member for shifting the same endwise to open said main valve and effect shifting of said selector valve means from normal position.

2. An air line gauge and inflating device comprising a housing having means for connecting an air line thereto, an endwise shiftable tubular member in said housing in communication with said means, a main valve carried by said means and when closed interrupting said communication and adapted to be opened by said member when the latter is shifted in one direction, means urging said valve toward closed position, a pressure gauge in said housing operatively associated and in communication with said member, an air tube operatively associated and in communication with said member and extending outwardly of said housing and adapted to be connected to an air chuck hose, shiftable selector valve means in said member normally maintained by biasing means in a position wherein said air tube is in communication with said pressure gauge through said member but shiftable by air pressure in said member when said main valve is opened to a position wherein communication between said tube and pressure gauge is interrupted but said tube remains in communication with said member and said first means, manually actuated means for shifting said member endwise to open said main valve and effect shifting of said selector valve means from normal position, and means operatively interconnecting said air tube and said manually actuated means wherefore movement of the latter moves said air tube and said member.

3. An air line gauge and inflating device as defined in claim 2 and wherein said manually actuated means is pivotally associated with said housing internally thereof.

4. An air line gauge and inflating device comprising an elongated housing which is substantially U-shaped in cross section and is provided on its underside with an opening, means carried by said housing for connecting an air line thereto, an endwise shiftable tubular member in said housing in communication with said means, a main valve carried by said means and when closed interrupting said communication but adapted to be opened by said member when the latter is shifted in one direction, means urging said valve toward closed position, a pressure gauge in said housing operatively associated and in communication with said member, an air tube operatively associated and in communication with said member and extending outwardly of said housing and adapted to be connected to an air chuck hose, shiftable selector valve means in said member normally maintained by biasing means in a position wherein said air tube is in communication with said pressure gauge through said member but shiftable by air pressure in said member when said main valve is opened to a position wherein communication between said tube and pressure gauge is interrupted but said tube remains in communication with said member and said first means, a manually actuated trigger extending through said opening in said housing and substantially U-shaped in cross section and having its legs pivotally connected interiorly to the side walls of said housing and straddling said air tube, and means operatively interconnecting said trigger and said tube wherefore pivotal movement of the trigger inwardly of said housing shifts said tube and said member to open said main valve.

5. An air line gauge and inflating device as defined in claim 4 and wherein the means which operatively interconnects the air tube and the trigger comprises a block through which said air tube extends, a transverse pin connecting said air tube to said block, and aligned openings in the legs of said trigger receiving the opposite ends of said pin.

6. An air line gauge and inflating device as defined in claim 4 and wherein spring means is associated with said air tube for urging said tube, said member and said trigger into normal position wherein said main valve is closed.

7. An air line gauge and inflating device as defined in claim 4 and wherein a coil spring is mounted on said air tube and has its opposite ends abutting respectively a fixed abutment carried by said housing and an abutment block fixed to said air tube.

8. An air line gauge and inflating device as defined in claim 4 and wherein said air tube is provided adjacent its inner end with diametrically aligned openings while said tubular member extends through said openings with a pressed fit therein and seals the open inner end of the air tube, said tubular member being provided with an opening providing said communication with said air tube.

9. An air line gauge and inflating device comprising a housing having means for connecting an air line thereto, a cover for said housing, means for securing said cover to the housing, an air tube in said housing and extending outwardly thereof and adapted to be connected to an air chuck hose, a pressure gauge in said housing, control means in said housing for selectively connecting said air tube with said air line connecting means or with said pressure gauge and detachably supporting said pressure gauge, said housing and said cover having cooperating notches in their adjacent contacting edges and said pressure gauge being provided with lug means extending into said cooperating notches and supporting said pressure gauge in said housing, wherefore when said cover is removed from said housing said pressure gauge may be readily removed therefrom by disengaging said lug means from said notches and said pressure gauge from said control means.

10. An air line gauge and inflating device as defined in claim 9 and wherein said pressure gauge includes an elongated tubular casing having therein an endwise movable scale bar projecting outwardly of one end of the casing, a closure member for said one end of the casing and provided with an opening through which said scale bar extends, said closure member being provided with said lug means which engage in said cooperating notches, the other end of said casing having a telescoping supporting relationship with said control means that selectively places the air tube in communication with the air line connecting means or with the pressure gauge.

11. An air line gauge and inflating device comprising a housing having means for connecting an air line thereto, a cover for said housing, means for securing said cover to the housing, an air tube in said housing and extending outwardly thereof and adapted to be connected to an air chuck hose, a pressure gauge in said housing and having a movable scale bar projecting from one end of the gauge, a closure member for said one end of the gauge and provided with an opening through which said scale bar extends, said housing and cover having cooperating notches in their adjacent contacting edges, said closure member being provided with lugs extending into said notches, means in said housing for selectively connecting said air tube with said air line connecting means or with said pressure gauge, the other end of said pressure gauge having a telescoping supporting relationship with said last named means, said cover having an opening overlying said scale bar and provided adjacent said opening with inwardly extending projections, and a magnifying button in said opening and provided with recesses into which said projections extend to retain the button in position.

JAMES H. MARCUM.

REFERENCES CITED

The following references are of record in the file of this patent:

UNITED STATES PATENTS

| Number | Name | Date |
|---|---|---|
| 1,059,037 | Collar | Apr. 15, 1913 |
| 1,527,661 | Anderson | Feb. 24, 1925 |
| 2,040,868 | Moody | May 19, 1936 |
| 2,285,569 | Crowley | June 9, 1942 |